(12) United States Patent
Bedier et al.

(10) Patent No.: US 10,970,697 B2
(45) Date of Patent: Apr. 6, 2021

(54) TRANSACTION MEDIATION METHOD

(71) Applicant: Poynt Co., Palo Alto, CA (US)

(72) Inventors: Osama Bedier, Palo Alto, CA (US);
Ray Tanaka, Palo Alto, CA (US);
Victor Chau, Palo Alto, CA (US);
Charles Feng, Palo Alto, CA (US);
Cheng Han Lee, Palo Alto, CA (US);
Lubab Al-Khawaja, Palo Alto, CA (US)

(73) Assignee: Poynt Co., Palo Alto, CA (US)

( * ) Notice: Subject to any disclaimer, the term of this patent is extended or adjusted under 35 U.S.C. 154(b) by 0 days.

(21) Appl. No.: 16/712,581

(22) Filed: Dec. 12, 2019

(65) Prior Publication Data

US 2020/0193405 A1 Jun. 18, 2020

Related U.S. Application Data

(60) Provisional application No. 62/779,340, filed on Dec. 13, 2018.

(51) Int. Cl.
*G06Q 40/00* (2012.01)
*G06Q 20/20* (2012.01)
*G06Q 20/02* (2012.01)
*G06Q 20/40* (2012.01)

(52) U.S. Cl.
CPC ......... *G06Q 20/204* (2013.01); *G06Q 20/027* (2013.01); *G06Q 20/403* (2013.01)

(58) Field of Classification Search
CPC .................................................. G06Q 20/204

USPC ......................................... 705/16, 39, 44, 65
See application file for complete search history.

(56) References Cited

U.S. PATENT DOCUMENTS

| | | | | |
|---|---|---|---|---|
| 2001/0025271 | A1* | 9/2001 | Allen | G06Q 20/04 705/65 |
| 2013/0282588 | A1 | 10/2013 | Hruska | |
| 2014/0279504 | A1* | 9/2014 | Cook | G06Q 20/3224 705/44 |
| 2015/0254665 | A1* | 9/2015 | Bondesen | G06Q 20/3672 705/44 |
| 2016/0012428 | A1* | 1/2016 | Haldenby | G06Q 20/3572 705/39 |
| 2016/0071102 | A1* | 3/2016 | Alvarez | G06Q 20/401 705/16 |
| 2017/0221049 | A1* | 8/2017 | Jivraj | G07F 7/1008 |
| 2018/0081787 | A1 | 3/2018 | Riddick et al. | |
| 2018/0174138 | A1 | 6/2018 | Subbarayan et al. | |
| 2018/0349892 | A1 | 12/2018 | Lattanzio et al. | |
| 2019/0114635 | A1* | 4/2019 | Gurunathan | G06Q 20/4012 |

FOREIGN PATENT DOCUMENTS

| | | |
|---|---|---|
| ES | 2683174 T3 | 9/2018 |
| WO | 2015103443 A1 | 7/2015 |
| WO | 2016054727 A1 | 4/2016 |

OTHER PUBLICATIONS

International Search Report and Written Opinion of the ISA for International Application No. PCT/US19/65977 dated Feb. 20, 2020.

(Continued)

*Primary Examiner* — Samica L Norman
(74) *Attorney, Agent, or Firm* — Jeffrey Schox; Diana Lin

(57) ABSTRACT

Systems and methods for processing transactions using a digital payment platform.

20 Claims, 11 Drawing Sheets

(56) References Cited

OTHER PUBLICATIONS

"Alipay Documentation Introduction", https://web.archive.org/web/20181219162759/https://intl.alipay.com/doc/barcode, last updated Aug. 23, 2018, downloaded from the internet on Nov. 25, 2019, 5 pages.

Williams, Robert "Lacoste's US Stores accept Alipay to target Chinese Tourists", https://www.mobilemarketer.com/news/lacostes-us-stores-accept-alipay-to-target-chinese-tourists/514666/, Jan. 12, 2018, downloaded from the internet on Nov. 25, 2019, 3 pages.

* cited by examiner

US 10,970,697 B2

TRANSACTION MEDIATION METHOD

CROSS-REFERENCE TO RELATED APPLICATIONS

This application claims priority to U.S. Provisional Application No. 62/779,340 filed 13 Dec. 2018, which is incorporated herein in its entirety by this reference.

TECHNICAL FIELD

This invention relates generally to the payments field, and more specifically to a new and useful intermediary system for digital payment processing in the payments field.

BACKGROUND

The rise of digital payment platforms has made it easier and cheaper for customers and merchants to complete transactions. However, these digital payment platforms evolved in a different ecosystem from conventional payment processing architectures (such as credit card systems), and have thus been unable to integrate with the conventional payment processing architectures, due to differences between the ecosystems' transaction flow, how funds are custodied, and stakeholder capabilities.

For example, conventional payment processing architectures settle to conventional merchant banks, while digital payment platforms directly settle transactions between user and merchant accounts supported by the digital payment platform. In another example, digital payment platforms invert the traditional payment processing flow—instead of the merchant sending the user's payment information to the payment processor (as in conventional payment processing architectures), wherein the payment processor processes the transaction, digital payment platforms require the user to send the transaction information to the digital payment platform, wherein the digital payment platform processes the transaction.

These architectural and capability differences have precluded digital payment platforms from seamlessly integrating with conventional payment processing architectures, which can be desirable to enable customers to transact with a wider range of merchants (e.g., merchants that have been connected to the conventional payment processing architectures, but not to the digital payment platforms), without requiring the merchants to change their accounting or banking practices.

This invention provides such new and useful system and method to bridge the digital payment platform into the conventional payment processing architectures.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
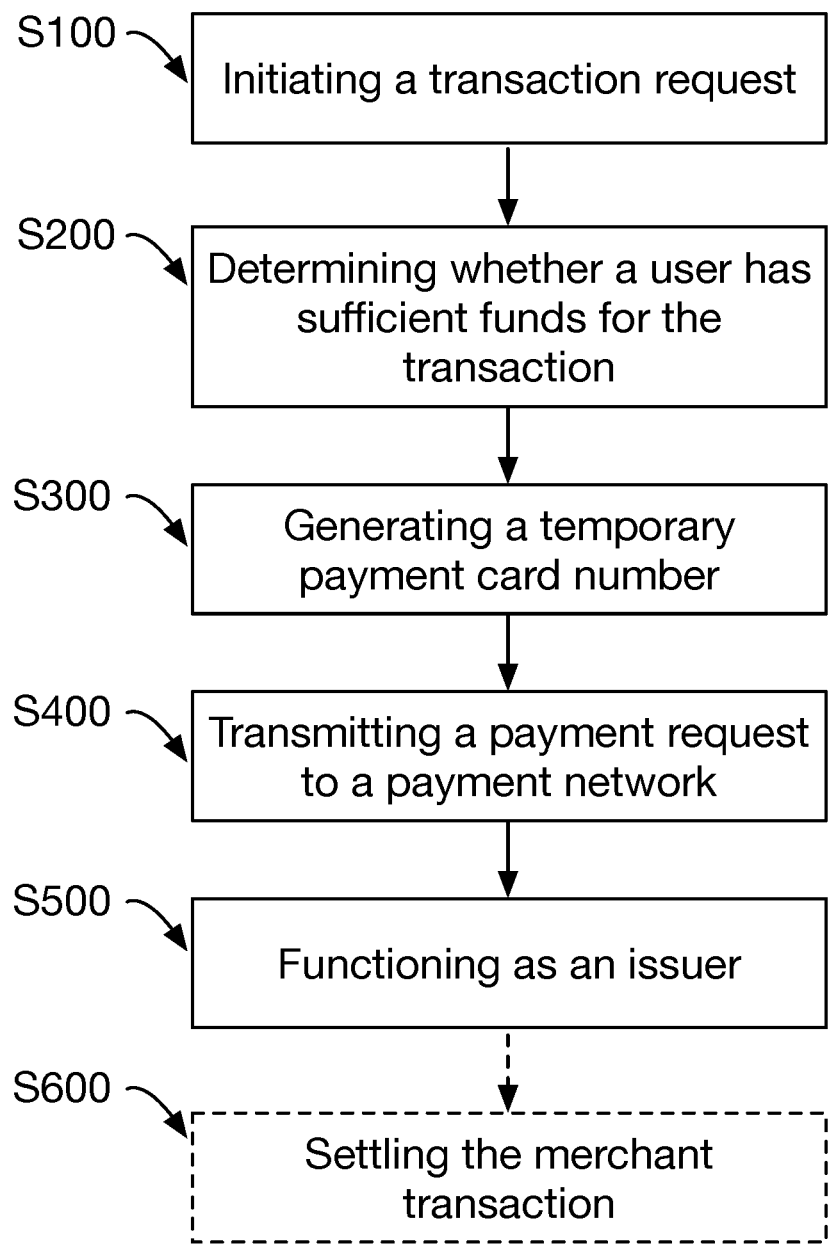
FIG. 1 is a schematic representation of a method, in accordance with variations.

As shown in FIG. 1, the method includes one or more of: initiating a transaction request S100; determining whether a user has sufficient funds for the transaction from a digital payment platform S200; generating a temporary payment card number S300; transmitting a payment request to a payment network for processing S400; and functioning as an issuer for the payment network for transaction confirmation S500. The method can optionally include settling the merchant transactions S600. In some variations, the method is a method for mediating transactions between digital payment platforms and conventional payment systems.

Figure 5:
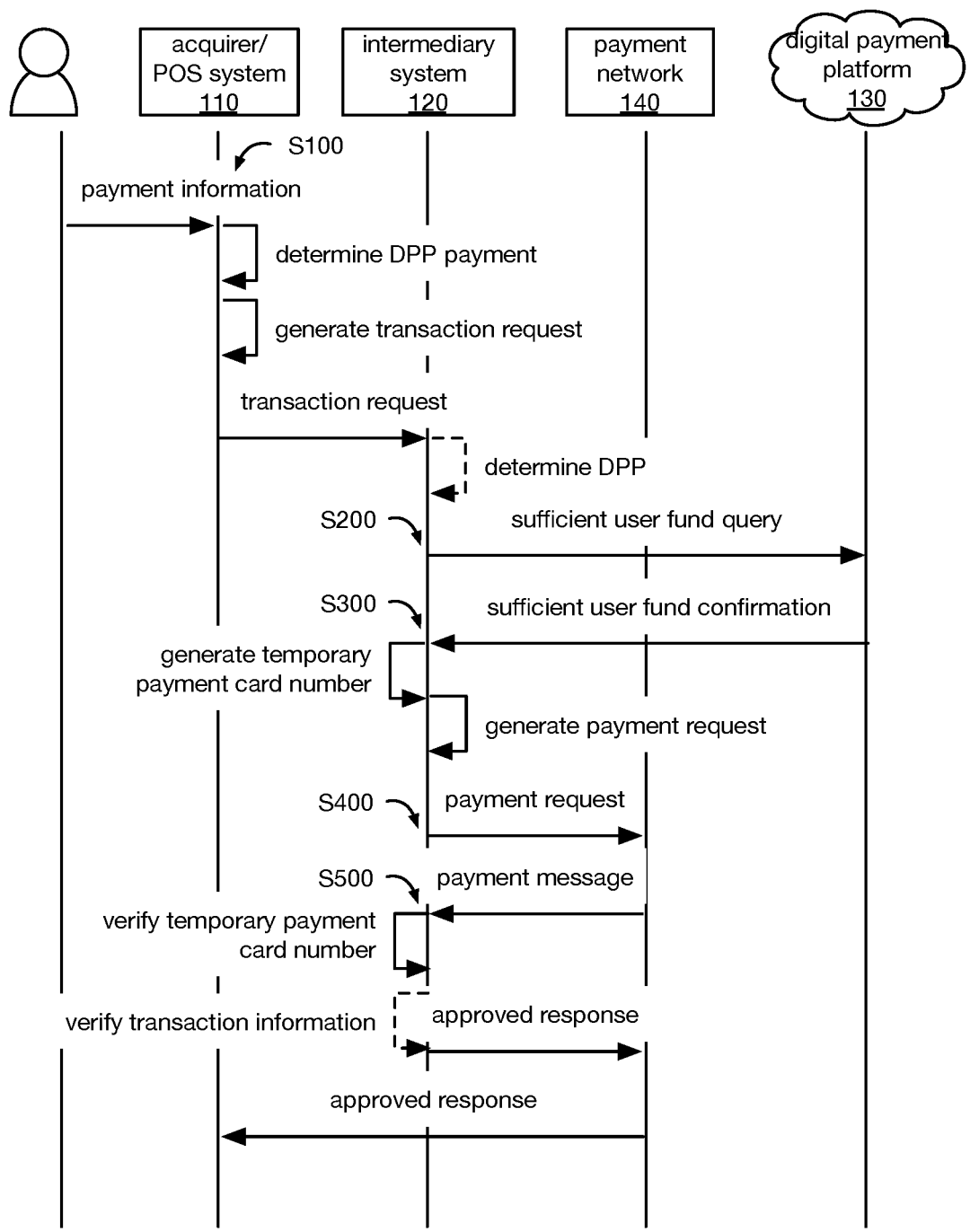
FIG. 5 is a schematic representation of a method, in accordance with variations.
Figure 7:
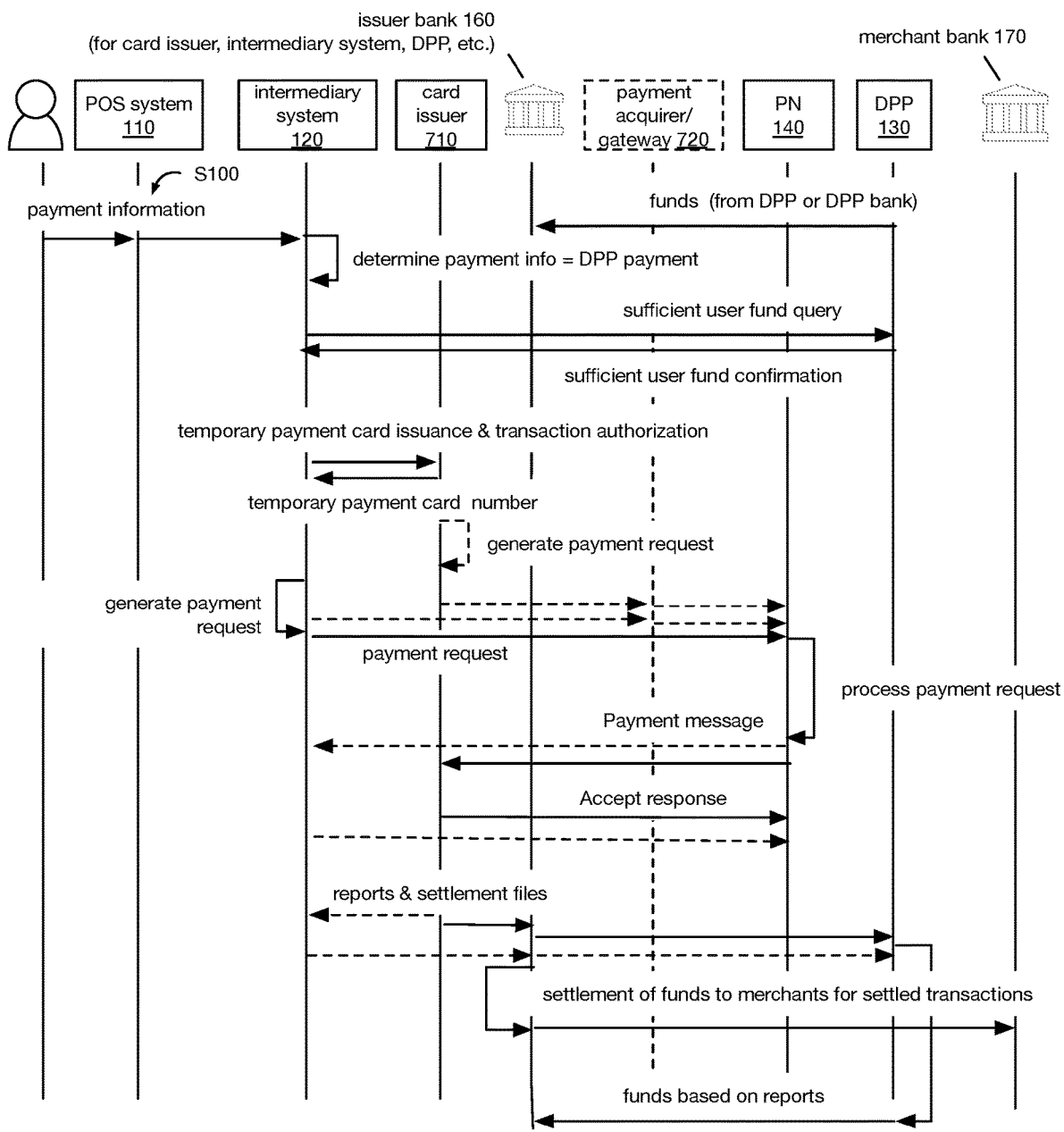
FIG. 7 is a schematic representation of a method, in accordance with variations.
Figure 8:
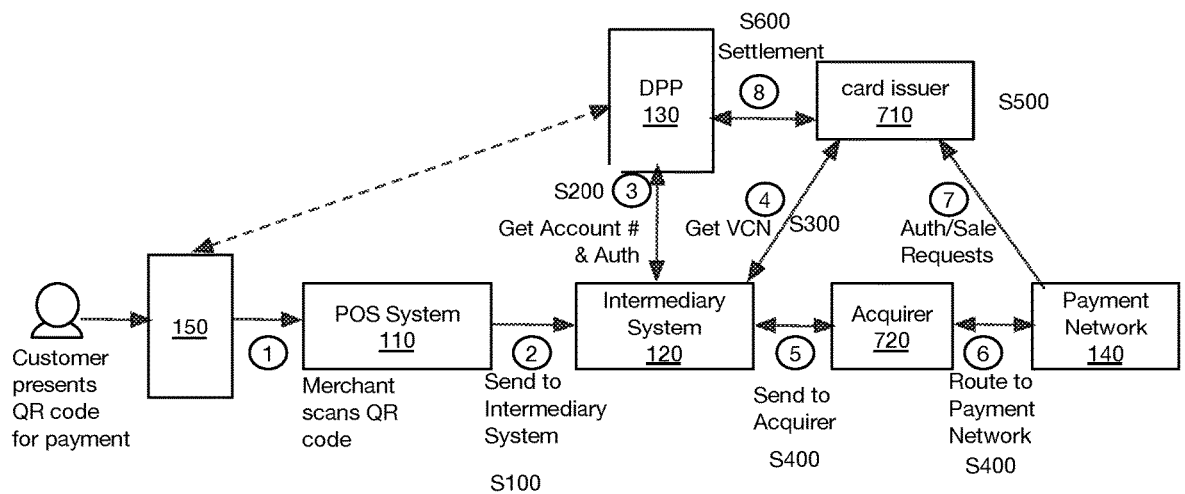
FIG. 8 is a schematic representation of a method, in accordance with variations.
Figure 9:
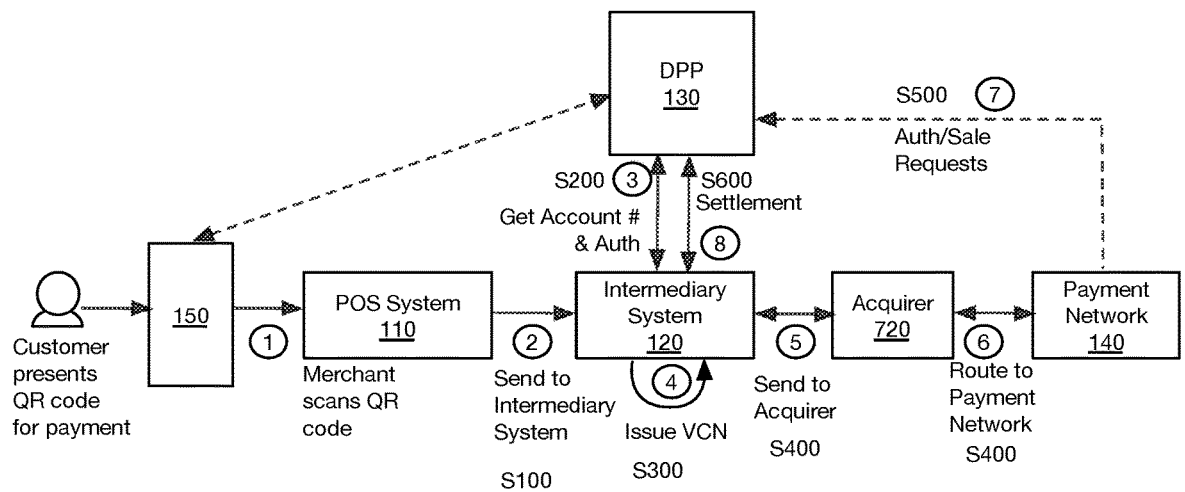
FIG. 9 is a schematic representation of a method, in accordance with variations.

FIGS. 5 and 9 are schematic representations of a variation of the method, in which the intermediary system 120 generates the temporary payment card number and FIGS. 7 and 8 are schematic representations of variations of the method, in which the issuer system 710 generates the temporary payment card number and functions as an issuer for the temporary payment card number. FIG. 9 is a schematic representation of a variation of the method, in which the intermediary system 120 generates the temporary payment card number and the DPP 130 functions as an issuer for the temporary payment card number.

In some variations, method functions to bridge the digital payment platform with conventional payment systems.

Figure 3:
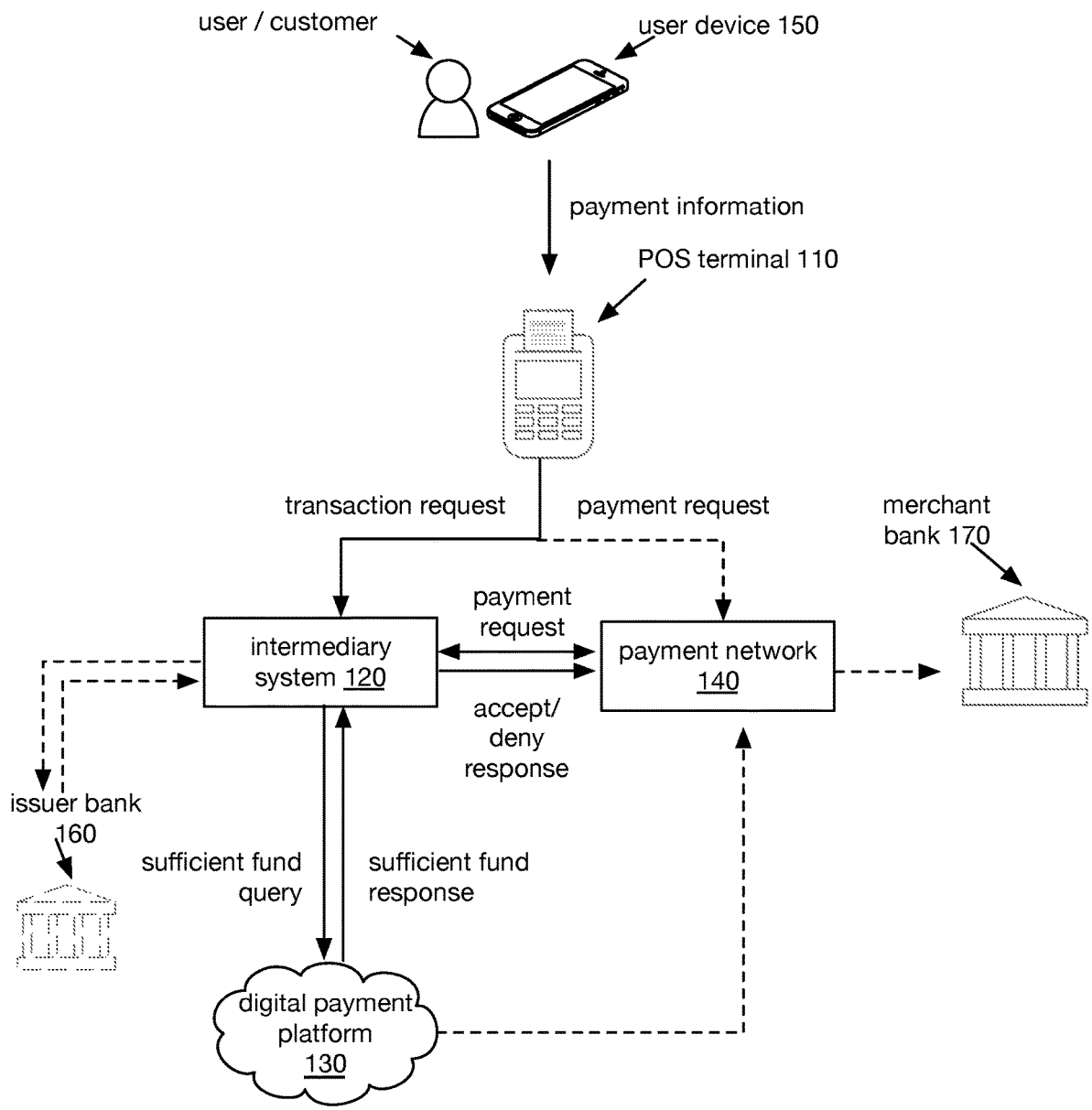
FIG. 3 is a schematic representation of a system, in accordance with variations.
Figure 13:
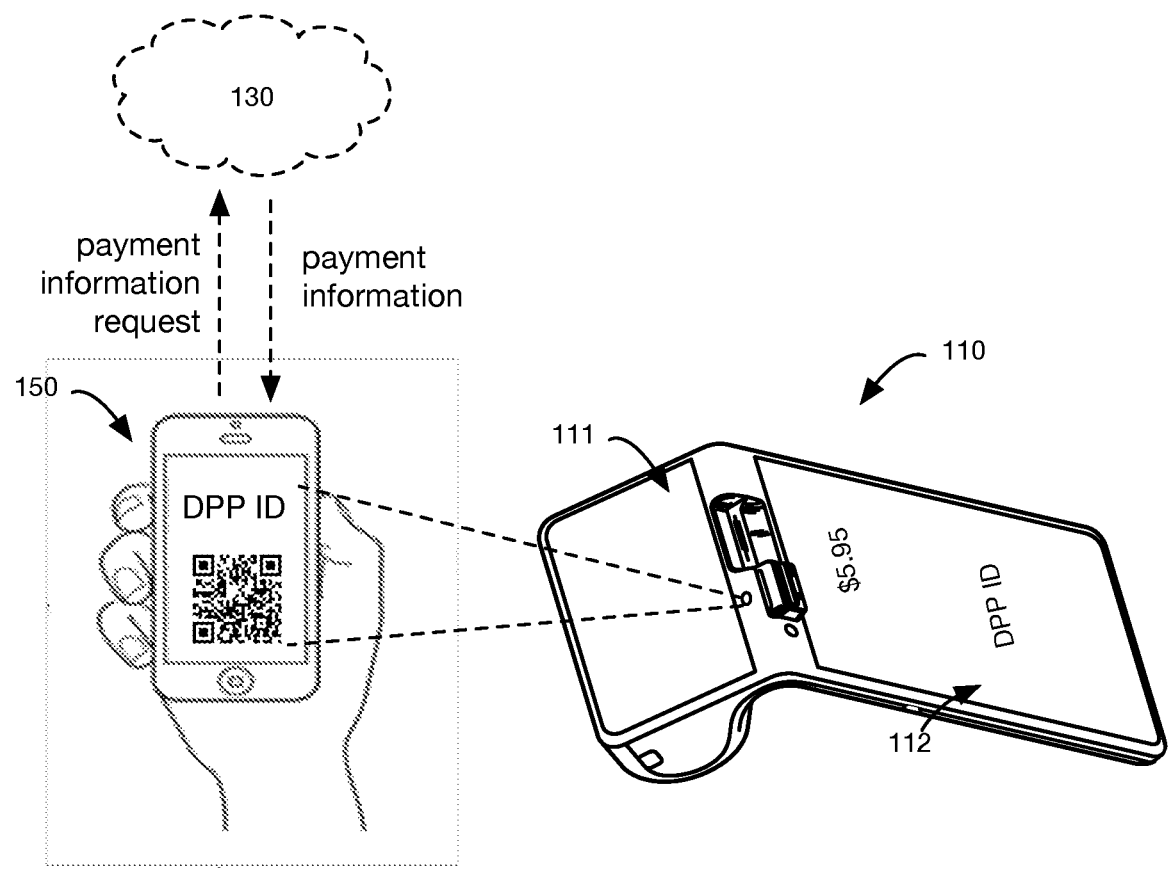
FIG. 13 is an example of the POS terminal reading the payment information.

In an example of method use (specific examples shown in FIGS. 5 and 7), the user can have a digital wallet and/or account hosted by a digital payment platform (e.g., 130 shown in FIG. 3) (e.g., AliPay, etc.), wherein the digital wallet and/or account can be linked to a wallet client (e.g., wallet application) executing on the user device (e.g., phone) (e.g., 150 shown in FIG. 3). When the user wants to pay for a transaction, the wallet client can present payment information (e.g., a QR code, NFC frame) (e.g., as shown in FIG. 13) that encodes the wallet identifier, the user account identifier, and/or other user identifier for payment. The payment information is then read by a point of sale terminal (e.g., no shown in FIG. 3), which forwards the payment information to the intermediary system (e.g., 120 shown in FIG. 3). The intermediary system (e.g., 120) can: identify the digital payment platform (e.g., 130) associated with the payment information, determine user- or account-identification information from the payment information, and query the digital payment platform (e.g., 130 to determine whether the user's wallet or account includes sufficient funds or credit for the transaction.

When the digital payment platform indicates that the user has sufficient funds and/or indicates that the intermediary system is authorized to complete the transaction (e.g., based on the metadata associated with payment information presentation on the user device, which substantially matches the transaction data sent by the intermediary system with the query), the intermediary system can generate a temporary credit card number (and/or payment request, such as an ISO 8583 message) that is compatible with the credit card network (e.g., VISA, MasterCard), and send the temporary credit card number to the credit card network (e.g., 140 shown in FIG. 3) for standard processing (e.g., determine the issuer and send the payment request to the issuer via a determined acquirer and/or payment network). In specific examples, the temporary credit card number can identify the intermediary system (e.g., 120) as the issuer, wherein the intermediary system returns a standard accept/deny response to the payment network. In specific examples, the temporary credit card number can be: valid for a limited period of time, be a single-use card number, and be specific to the transaction, merchant, or other transaction information, such that the temporary credit card number cannot be used for another transaction.

When the intermediary system (e.g., 120) receives the forwarded payment request from the credit card network (e.g., 140, the intermediary system can respond with an approval message, and can optionally evaluate the payment request (e.g., based on a set of rules, such as whether the merchant is blacklisted or whitelisted, whether the payment information from the payment request matches the payment information associated with the temporary payment card number, whether the payment request is associated with a live temporary payment card number or received within an active time window associated with the temporary payment card number, whether the funding source (e.g., a customer's DPP account) for the temporary payment card has been verified to have sufficient funds for the transaction, etc.). The credit card network (e.g., 140) can then forward the approval message to the point of sale terminal (e.g., 110) (e.g., directly, via the intermediary system; indirectly, using a conventional approve/deny response routing path; etc.) for message display to the user and the merchant. Alternatively, the intermediary system can forward the approval message to the merchant or POS terminal for display.

In an example of settling the merchant transactions (example shown in FIG. 6), the merchant can send the settlement request to the credit card network (e.g., using conventional settlement methods, such as by using the POS system no), wherein the credit card network (e.g., 140) can settle the transactions with the intermediary system (e.g., 120) as the issuer. In a first specific example, the intermediary system (e.g., 120) can pay the transaction amounts directly, from an account custodied by the intermediary system. In some implementations, the intermediary system can receive funds from the user accounts hosted by the digital payment platform (e.g., during sufficient fund verification, at a later time, during settlement, etc.). In a second specific example, the intermediary system (e.g., 120) can instruct the digital payments platform (e.g., 130) to directly pay the credit card network or the merchant bank (e.g., 170 shown in FIG. 3) (e.g., wherein the merchant banking information can be extracted from the settlement request). In a third specific example, the intermediary system (e.g., 120) can instruct an issuer bank (e.g., 160 shown in FIG. 3) (custodying funds associated with the DPP and/or intermediary system) to pay the merchant bank (example shown in FIG. 7).

In some examples of settling the merchant transactions (example shown in FIG. 6), the merchant can send the settlement request to the credit card network (e.g., using conventional settlement methods) by using the POS system (e.g., 110), wherein the credit card network (e.g., 140) can settle the transactions with an issuer system (e.g., 710 shown in FIG. 7) as the issuer of the temporary payment card number. In some examples, the issuer system (e.g., 710 can instruct an issuer bank (e.g., 160 shown in FIG. 3) to pay the merchant bank (example shown in FIG. 7). However, the transactions can be otherwise settled. However, the method can be otherwise performed.

2. Benefits

The intermediary system and method can confer several benefits over conventional payment systems.

Payment via a digital payment platform (DPP) typically involves transfer of funds from a first account of the digital payment platform to a second account of the digital payment platform, by the digital payment platform. Conventionally, for a merchant to accept payment via a digital payment platform, the merchant creates an account at the digital payment platform; thereafter, customers can pay the merchant by transferring funds to the merchant's digital payment platform account.

Variations of systems and methods disclosed herein allow a customer to pay a merchant by using a digital payment platform account in cases where the merchant does not have a digital payment platform account. In some variations, an issuer account is created at the digital payment platform, wherein the digital payment platform can transfer funds from a customer's DPP account (at the digital payment platform) to the issuer's DPP account. In some variations, the issuer's DPP account is used as a funding source for a temporary payment card number. In some variations, a DPP account (e.g., a customer's DPP account) is used as a (direct or indirect) funding source for a temporary payment card number. In some implementations, a transfer of funds (via the digital payment platform) from the customer's DPP account to the issuer's DPP account is associated with a temporary payment card number.

First, the intermediary system (e.g., 120) enables the digital payment platform (e.g., 130) to interface with the conventional payment system without partnering as an issuer with the conventional payment system. In one variation, the intermediary system can function as the issuer in lieu of the digital payment platform. In a second variation, the intermediary system functions as an intermediary or manages fund transfer and tracking between a conventional issuer and the digital payment platform.

Second, the intermediary system enables merchants who are outside of the digital payment platform's ecosystem, but within the conventional payment system's ecosystem, to accept digital payments backed by the digital payment platform. In some variations, during processing of a payment transaction using a customer's digital payment platform account, a temporary payment card number is generated (the funding source for the temporary payment card number is the customer's DPP account), the merchant uses a payment network (e.g., a conventional credit card network)

to charge the temporary payment card number for the transaction's payment amount. In some variations, the funds for the charge are provided by a bank account associated with the issuer's DPP account (or alternatively a bank account associated with the customer's DPP account). In some variations, the funds for the charge are provided by a reserve bank account of the DPP. In some implementations, the bank account associated with the issuer's DPP account receives the funds for the charge (or is replenished after the charge) from a bank account associated with the customer's DPP account. In this manner, a customer can initiate payment by using a digital payment platform account, and the merchant receives funds as if the transaction was processed by using a conventional payment system (e.g., a credit card network). In variations, the merchant is not required to create an account at the digital payment platform system, as long as an issuer account is created to fund temporary payment card numbers.

Third, the intermediary system offers a more secure transaction method by generating temporary and/or transaction-limited payment card numbers, which can preclude fraud if the temporary payment card number is stolen. The intermediary system and/or transaction mediation method can offer further security if the digital payment platform also uses temporary payment information (e.g., QR codes, wallet identifiers, etc.), which can prevent fraud if the payment information is stolen (e.g., because the digital payment platform will reject a sufficient fund query based on the stolen payment information).

Fourth, the method can allow merchants to keep their current point of sale terminals (e.g., no new hardware needs to be purchased). In variations, the intermediary system is simply added as a secondary acquirer to the point of sale terminal, wherein transactions having digital payment information can be forwarded to the intermediary system instead of conventional acquirers. In variants, the point of sale terminal (e.g., 110) can make the initial determination on where to route the payment request: the primary acquirer (e.g., conventional acquirer) or the secondary acquirer (e.g., the intermediary system) based on the payment format and/or payment information.

However, the system and method can confer any other suitable set of benefits, including, but not limited to: providing a platform that accepts visual identifier-based payments (e.g., QR code-based payments); supporting EMV rails for visual identifier payments; supporting DPP rails for visual identifier payments; driving down MDR fees for merchants; and supporting digital wallet applications.

3. System

Figure 2:
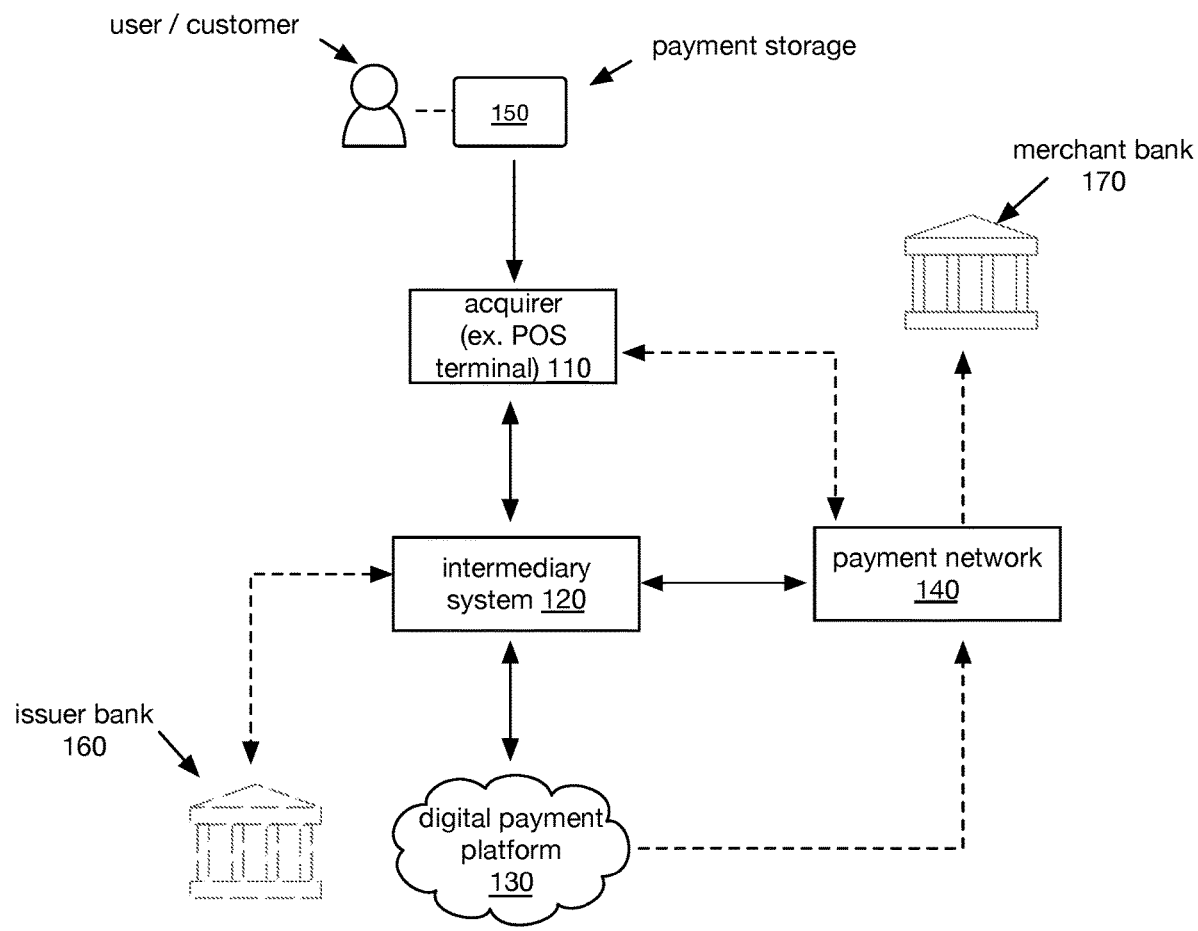
FIG. 2 is a schematic representation of a system, in accordance with variations.

The intermediary system 120 functions to execute all or portions of the method. In variants, the intermediary system 120 can be treated as, or perform all, or a portion of the functions of a conventional acquirer (e.g., to receive transaction requests from the merchant; to receive and route the payment information); a conventional processor (e.g., collect the payment information, selectively routing the payment information based on whether the payment information is associated with a digital payment platform); as a conventional issuer (e.g., to settle merchant transactions), example shown in FIG. 5; or as any other suitable credit card processing entity. Additionally or alternatively, the intermediary system 120 can interact with conventional acquirers, processors, payment networks, issuers (example shown in FIGS. 7 and 8), and/or any other suitable entity. The intermediary system 120 preferably concurrently executes multiple instances of the method, but can alternatively execute multiple method instances serially. The intermediary system 120 is preferably a remote computing system, but can alternatively be any other suitable system. The intermediary system 120 is preferably separate and distinct (e.g., owned by a separate entity) from the digital payment platform(s) 130 and/or the payment network(s) 140, but can alternatively be hosted by the digital payment platform(s) and/or the payment network(s). An example of the intermediary system is the Poynt Cloud™. As shown in FIG. 2, in variants, the intermediary system 120 can be used with a point of sale terminal (POS terminal) no, a payment network (PN) 140, a digital payment platform (DPP) 130, and/or any other suitable set of systems.

The intermediary system 120 can be associated with one or more digital payment platforms 130, which function to provide account management, P2P transfer, bill pay, digital ID storage, digital payments, online-check out, as an issuer (example shown in FIG. 9), as an acquirer, and/or other services. Examples of digital payment platforms include AliPay, WeChat Pay, Venmo, Zelle, Airpay, Favepay, Remo, CC Financial Services, EZi Wallet, or any other suitable electronic payment platform or e-commerce payment platform. The digital payment platform 130 preferably maintains one or more accounts for each user, wherein the accounts hold custodied currency (e.g., fiat, cryptocurrency), be associated with credit, or be associated with any other suitable form of payment.

The digital payment platform (DPP) 130 can be associated with one or more wallets that function as a user interface between the user and the digital payment platform. The wallet can be hosted by the digital payment platform 130, be a third-party wallet connected to the digital payment platform, or be any other suitable wallet. The wallet can: present payment information (e.g., associated with the user account on the digital payment platform), receive payee information (e.g., read a merchant identifier to complete a transaction), initiate transactions or fund transfers, or perform any other suitable functionality. The wallet is preferably a digital or electronic wallet executing on the user device 150, but can alternatively be a hardware key (e.g., an RFID or NFC tag with wallet information), or be otherwise configured. The wallet preferably runs (e.g., is executed by) on a user device, but can be otherwise implemented.

In one example of wallet operation, the wallet can generate or present payment information (e.g., in response to user instruction) for point of sale terminal receipt. The payment information can include: a wallet identifier, a user account identifier, a user identifier, a card number associated with the digital payment system (e.g., a credit card number, a digital card number), a signed message (e.g., signed by the wallet or user device's private key), or be any other suitable identifier. The payment information can be: temporary (e.g., for a limited time, for a single transaction, for a limited number of transactions, etc.), static, or be otherwise limited or unlimited. The wallet can optionally store or transmit the payment information to the digital payment platform 130 (e.g., with or without payment information generation or presentation metadata, such as payment information generation time, user device location, etc.), wherein the digital payment platform 130 can store the payment information (and any associated metadata) with the user account. However, the wallet can perform any suitable set of functionalities, and be otherwise used.

In some variations, the intermediary system 120 is associated with a payment network ("rails"; PN) 140, which functions to: maintain one or more transmission protocols, route payment requests to the issuers associated with a payment card number, receive an approved or denied message from the issuer, and relay the approved or denied message back to the acquirer (or intermediary system). The payment network 140 can optionally facilitate transaction settlement, wherein the payment network receives one or more settlement requests from the merchant, each with one or more approved transactions, determines the issuers for each of the transactions; requests money from the issuers; and distributes the money to the merchants' bank 170. Examples of payment networks include American Express, Diners Club, JCB, Mastercard, UnionPay, Visa, and/or any other suitable payment network. Examples of banks include: Bank of China, DBS Bank, Oversea-Chinese Banking, The Association of Banks in Singapore (PayNow), United Overseas Bank, Wells Fargo, Chase, Citibank, and/or any other suitable bank.

The intermediary system 120 can optionally interact with a conventional acquirer (e.g., 720 shown in FIG. 7), which can function to receive and route the payment request (and/or transaction request). The acquirer 720 is preferably an intermediary between the intermediary system 120 and the PN 140 (e.g., receives the payment request from the intermediary system 130 and routes the payment request to the appropriate PN 140, but can alternatively or additionally perform any suitable function. The conventional acquirer 720 can be a bank (e.g., merchant bank, acquirer bank, issuer's bank, DPP's bank, intermediary system's bank, third party bank), or be any other suitable acquirer.

In some variations, the intermediary system 120 is associated with a point of sale system 110 (e.g., point of sale terminal; POS terminal). The point of sale terminal no functions to obtain payment information from a user. FIG. 14 illustrates an exemplary user interface displayed by the POS system no to prompt a user to provide their payment information (e.g., by scanning a QR code using a camera or scanner of the POS system 110). The point of sale terminal no can receive the payment information by: reading a visual code encoding the payment information (e.g., scanned off of a user device executing a wallet application or other digital payment application); receiving data from a short-range wireless communication system, such as an NFC payment system or RFID payment system; reading the payment information off of a payment card (e.g., a magstripe, an integrated circuit chip, etc.), or otherwise receiving the payment information. The point of sale terminal no can optionally determine (e.g., receive, generate) transaction information (e.g., the transaction amount, purchased items, transaction time, transaction geolocation, etc.); determine a merchant identifier (e.g., the POS terminal identifier, the intermediary system's merchant identifier, the merchant bank's merchant identifier, a global merchant identifier, etc.); determine how to route payment information or payment requests (e.g., example shown in FIG. 3); or determine any other suitable information.

Figure 4:
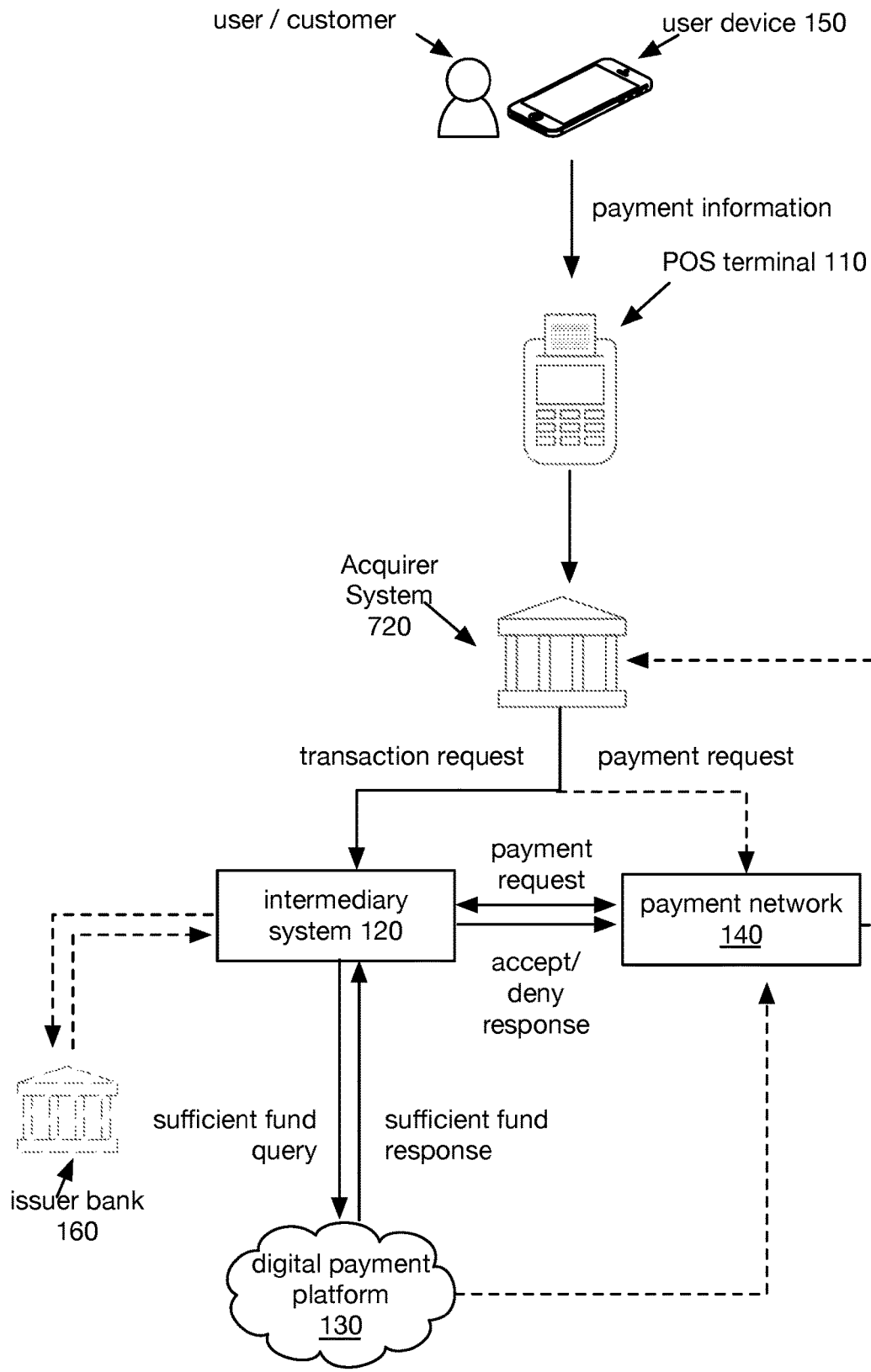
FIG. 4 is a schematic representation of a system, in accordance with variations.

The intermediary system 120 can be used with an acquirer system (e.g., 720) that functions to receive payment information. The acquirer system 720 can optionally function to determine how to route payment information or payment requests (e.g., to the intermediary system, to the PN, etc.), example shown in FIG. 4. The acquirer system can be: the POS terminal, a merchant bank, or any other suitable acquirer system.

4. Method

As shown in FIG. 1, the method includes at least one of: initiating a transaction request S100; determining whether a user has sufficient funds for the transaction from the digital payment platform S200; generating a temporary payment card number S300; transmitting a payment request to a payment network for processing S400; and functioning as an issuer for the payment network for transaction confirmation S500. The method can optionally include settling the merchant transactions. The transaction mediation method functions to integrate digital payments, supported by digital payment platforms, into conventional payment processing architectures.

In some variations, at least one of the POS terminal, the intermediary system, the digital payment platform, the payment network, an issuer system, an acquirer system, and/or any other suitable system can perform at least a portion of the method.

In some variations, the method is performed by an intermediary system, but can additionally or alternatively be performed by the payment network, the digital payment platform, or by any other suitable entity.

The method is preferably performed each time a digital payment is made, but can alternatively or additionally be performed each time a digital payment is made with a merchant outside of the digital payment platform (e.g., a merchant without a digital payment platform account or identifier), or at any suitable time.

When information or data is stored or transferred, the information or data can be: cleartext, as a hash, in an encrypted format (e.g., encrypted with a key associated with the intermediary system, the DPP, the payment network, the issuer, etc.), signed (e.g., with a verification key associated with the merchant, the intermediary system, the DPP, etc.), and/or otherwise stored.

Initiating a transaction request S100 functions to initiate the transaction mediation process. The transaction request is preferably initiated by the POS system, but can alternatively be initiated by the intermediary system 120, by the PN 140, by the DPP 130, or by any other suitable system.

The transaction request can include: the payment information, the transaction amount, a merchant identifier, other transaction information (e.g., transaction time), or any other suitable information. In variants, the transaction request can be a payment message (e.g., an ISO 8583 message).

The intermediary system preferably stores all or a portion of the data within the transaction message (e.g., for payment verification in S500), but can process the transaction request in any suitable manner. In one example, the intermediary system stores the transaction information (e.g., transaction amount, transaction timestamp) and the merchant identifier for payment verification in S500.

The transaction request is preferably generated in response to receiving the payment information from the user, but can be generated at any suitable time. Receiving the payment information from the user can include: scanning, reading, receiving a frame, or otherwise receiving payment information from a payment storage mechanism (e.g., a digital wallet, a physical card, etc.).

The payment information can be provided to the POS terminal 110 in the form of: a visual identifier (e.g., QR code, barcode, text, etc.) displayed on a user device 150, a short-range wireless communication frame (e.g., NFC frame, RFID frame), a physical card (e.g., magstripe or IC chip), manually entered, or in any other suitable format.

The payment information can be: static (e.g., a static value), dynamically determined and transaction- or time-limited (e.g., randomly generated for the transaction, calculated using the payment information presentation timestamp, generated using a security key, etc.), or have any suitable set of properties. When the payment information is dynamic, the payment information is preferably generated by the DPP (e.g., based on the timestamp, the user account, the transaction information, etc.), but can be generated by any other suitable system. When the payment information is dynamic, the digital payment platform 130 preferably stores the presented payment information in association with the respective DPP user account for later payment validation.

The payment information can include: a user account identifier (e.g., globally unique, temporally unique, static, dynamically generated by the DPP and provided to the user, etc.), a DPP identifier, and/or any other suitable information.

S100 (initiating a transaction request) preferably includes: generating the transaction request and providing the transaction request to the intermediary system 120. However, S100 can be otherwise performed.

Generating the transaction request can include: receiving the payment information (e.g., from the user), receiving the transaction information (e.g., from the merchant, from POS system memory, etc.), and generating the transaction request based on the payment information and the transaction information. Generating the transaction request can optionally include encrypting the transaction request.

The transaction request is preferably generated (and provided) by the POS system, but can additionally or alternatively be generated by a website, a server, or any other suitable system. The transaction-generating system preferably generates the transaction request in response to receiving the payment information from the user, but can alternatively be generated at any suitable time.

The system generating the transaction (e.g., the POS system 110) can receive the payment information via at least one of: a user input device of the POS system, a camera of the POS system, a scanner of the POS system, a wireless communication system of the POS system, a user device (e.g., 150), a card reader, and/or any other suitable device. In one example, receiving payment information includes scanning a QR code displayed by a user device (e.g., 150) by using a camera of the POS system no. However, the transaction request can be otherwise generated.

Providing the transaction request to the intermediary system 120 functions to send the transaction request to the intermediary system. The transaction request can be: transmitted, broadcast, pulled (e.g., requested by the intermediary system), or otherwise provided to the transaction request. The intermediary system preferably receives the transaction request (e.g., from the transaction request generating system, from a transmitting system, from a payment network, etc.), but can alternatively generate the transaction request or otherwise obtain the transaction request.

In some variations, providing the transaction request can optionally include: determining whether the payment information corresponds to a payment network or a DPP. This can be used to: generate the transaction request, route the transaction request, or otherwise used. This can be performed by the transaction request generating system (e.g., the POS system), the intermediary system, and/or any other suitable system.

In a first embodiment, the POS system determines whether the payment information corresponds to a payment network or a DPP, and optionally, which payment network or DPP. In one example, the transaction request is generated according to the associated payment network's standard when the payment information is associated with a payment network, and generated according to the intermediary system's or DPP's standards when the payment information is associated with a DPP. In a second example, the transaction request can be sent to the associated payment network (e.g., associated with the merchant) when the payment information is associated with the payment network, and sent to the intermediary system when the payment information is associated with a DPP. However, the transaction requests can be otherwise generated or sent. In some variations, the POS system 110 provides the transaction request to the intermediary system 120 responsive to a determination that the payment information corresponds to a DPP.

In a second embodiment, the intermediary system determines whether the payment information corresponds to a payment network or a DPP, and optionally, which payment network or DPP. In this embodiment, the transaction request is preferably in a standard format, and the intermediary system can selectively route or process the transaction request in accordance with the disclosed method, depending on whether the payment information was associated with a payment network or a DPP, respectively. In some examples, the intermediary system 110 receives the payment information from the POS system 110, and determines whether the payment information corresponds to a DPP.

However, S100 can be otherwise performed.

Figures 14A, 14B, 14C, 14D:
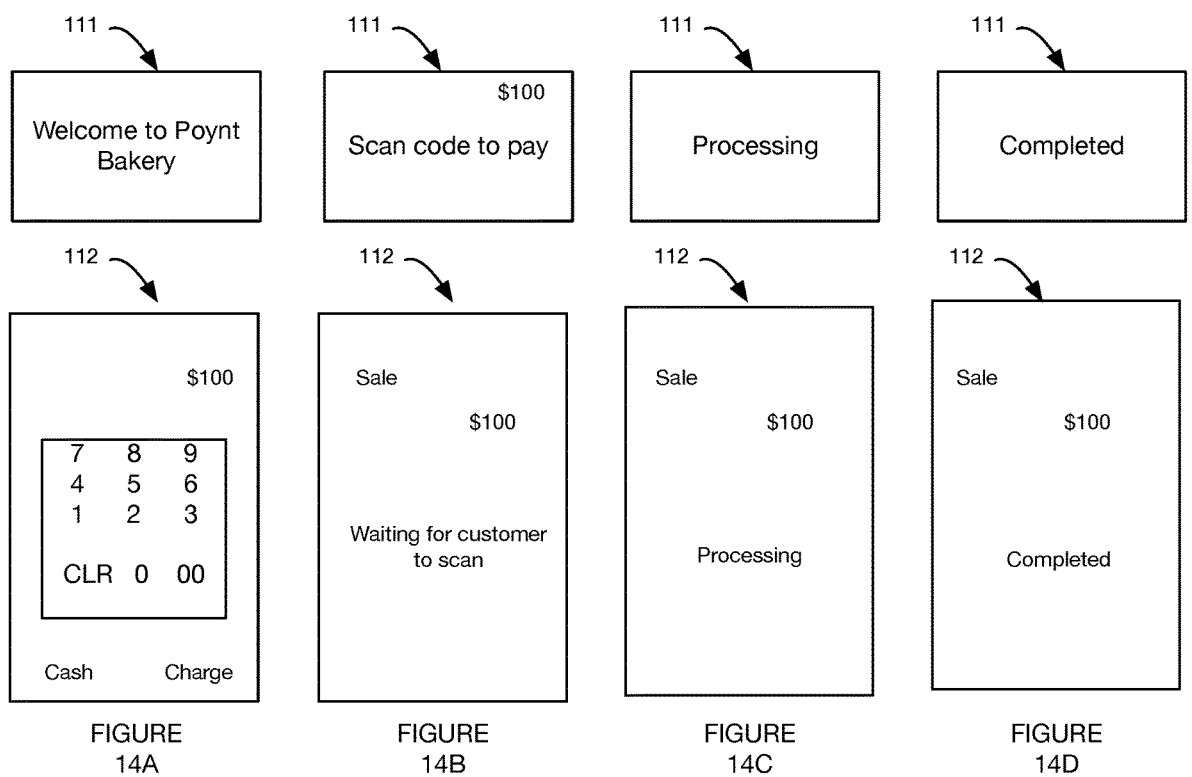
FIGS. 14A-D are illustrations of user interfaces, in accordance with variations.

FIGS. 14A-C illustrate user interfaces displayed on a customer-facing display 111 and a merchant-facing display 112 of the POS system 110. In some implementations, S110 includes the POS system 110 displaying a user interface (e.g., as shown in FIG. 14B) on a customer-facing display (e.g., 111 shown in FIG. 13) promoting a user to scan a QR code, and the POS system scanning the customer's QR code (e.g., as shown in FIGS. 14C and 14D).

In some variations, the transaction request is routed to the intermediary system 120 for receipt, but can be otherwise initiated and/or received by the intermediary system.

In a first example, the POS terminal 110 directly sends the payment information (e.g., in the transaction request) to the intermediary system 120, wherein the intermediary system 120 can selectively initiate the remainder of the method (e.g., when the payment information is associated with a DPP) or route the transaction request (in the form of a payment request) to a conventional acquirer (e.g. 720).

In a second example, a transaction routing system can: receive the payment information; determine the payment type (e.g., conventional payment or digital payment); determine an endpoint based on the payment type (e.g., conventional acquirer, e.g., 720, for conventional payments or intermediary system 120 for digital payments); generate a payment message or transaction request including the payment information, transaction information, and/or any other suitable information; and transmit the payment message to the determined endpoint. In this variation, the intermediary system 120 receives the transaction request when the determined endpoint is the intermediary system 120. However, the payment information can be otherwise routed.

The payment type can be determined based on: the mechanism used to obtain the payment information (e.g., wherein payment information read by optical scanners and short-range communication can be considered digital payments, and payment information read by magstripe readers or IC chip readers can be considered conventional payments), the payment information itself (e.g., based on the payment information format, length, numbers, etc.), based on an entry received from the user or merchant (e.g., wherein the user or merchant selects a DPP as a payment option on the POS terminal), or otherwise determined.

The transaction routing system can be: the intermediary system 120, the POS terminal 110 (e.g. wherein the POS terminal directly routes the transaction request to the intermediary system 120 upon determination that the payment information is associated with a digital payment), an acquirer (e.g., 720) (e.g., a conventional acquirer, wherein the intermediary system 120 can be registered as an auxiliary payment network for payment information associated with a digital payment), or be any other suitable system. However, the transaction request can be routed in any other suitable manner.

Determining whether a user has sufficient funds for the transaction from the digital payment platform S200 functions to determine whether the digital payment platform 130 will fulfill the transaction. In some variations, S200 is performed responsive to a determination that the payment information corresponds to a DPP. In some variations, S200 includes determining whether a DPP user account associated with the payment information has sufficient funds for the transaction request. In some variations, determining whether a DPP user account associated with the payment information has sufficient funds for the transaction request includes identifying a DPP associated with the DPP user account, and communicating with the DPP.

S200 is preferably performed by the intermediary system 120, but can alternatively be performed by the merchant bank (e.g., 170), the PN 140, the POS terminal 110, or by any other suitable entity. S200 is preferably performed after receipt of the transaction request S100 (e.g., at the intermediary system), but can alternatively or additionally be performed: upon receipt of the payment information, upon receipt of the payment message from the PN in S500 (e.g., wherein the PN treats the DPP as an issuer), or at any suitable time.

In a first variation, S200 includes: extracting the payment information from the transaction request; optionally determining a DPP (e.g., 130) based on the payment information; and querying the DPP 130 based on the payment information (e.g., via an API provided by the DPP). In a second variation, S200 includes: extracting the payment information and the transaction amount from the transaction request; identifying a user account associated with the payment information; and determining whether the user balance (e.g., currency, available credit, etc.) exceeds the transaction amount by a predetermined amount. However, S200 can be otherwise performed.

Determining a temporary payment card number S300 functions to generate a card number that is compatible with the payment network(s) 140.

The temporary payment card number can be generated: by the intermediary system 120 (example shown in FIG. 5 and FIG. 9), by a third party (e.g., an issuer system, example shown in FIG. 9; a third party card generation system; etc.), by the DPP, and/or by any other suitable system. When the temporary payment card number is generated by a third party system, S300 can include sending a card generation request to the card generation system, wherein the card generation request can include: a request for a new card number, validity parameters (e.g., validity duration, validity geolocation), a payment network (e.g., selected based on the acquirer associated with the merchant, based on the merchant, etc.), transaction parameters (e.g., transaction amount, merchant identifier, etc.), an issuer identifier (e.g., the intermediary system, the DPP, an issuer bank, etc.), and/or any other suitable set of request parameters. Validity parameters can be: predetermined, automatically determined (e.g., based on user habits, based on the payment network, etc.), manually specified, or otherwise determined. The request parameters can optionally be stored in association with the temporary payment card number by the intermediary system 120 or by any other suitable system.

The temporary payment card number can be generated: in response to receipt of the transaction request; after determination that the user has sufficient funds for the transaction (e.g., in response to receipt of an authorization confirmation for the transaction from the DPP); before receipt of the transaction request (e.g., wherein a set or batch of temporary payment card numbers are generated and unassigned; generated for each user; etc.); or generated at any other suitable time. When the temporary payment card numbers are pre-generated, a temporary payment card number can be activated (e.g. for the validity duration) for a user in response to receipt of the transaction request S100, sufficient fund determination S200, or at any other suitable time.

In some variations, S300 includes generating a temporary payment card number that uses the DPP as a funding source. In some variations, S300 includes storing a data structure that identifies the DPP as a funding source for the temporary payment card number. In some variations, S300 includes the intermediary system 120 sending a card number generation request to an issuer system (e.g., 710).

S300 can optionally provide level of security to the digital transaction, in case payment information is stolen. S300 is preferably performed by the intermediary system 120, but can alternatively be performed by the merchant bank 170, the PN 140, the POS terminal 110, the DPP 130 (e.g., wherein the DPP returns the temporary payment card number), an issuer system 710, or by any other suitable entity. S300 is preferably performed after receiving confirmation of user fund availability from the DPP 130 (e.g., at the intermediary system 120), but can alternatively or additionally be performed: upon receipt of the payment information, upon receipt of the transaction request (e.g., in parallel or asynchronously with S200), or at any suitable time.

The temporary payment card number is preferably temporarily valid for a validity duration (e.g., active time window), which can increase payment security because the temporary payment card number will not be approved by the intermediary system outside of the validity duration. The validity duration can be: a static duration (e.g., 4 seconds), be the amount of time for a PN to verify the transaction with an issuer, be manually set, or be otherwise determined. The temporary payment card number is preferably authorized for only the transaction amount, but can alternatively be authorized for: a predetermined amount above the transaction amount, a predetermined amount (e.g., for the user), the credit limit or account limit of the user's DPP account, or any other suitable amount.

The temporary payment card number can be persisted or stored for: the validity duration, until the associated transaction is settled, or for any suitable period of time. The temporary payment card number can optionally be stored with: the transaction information, the merchant, the payment information, the DPP, an issuer (e.g., associated with the DPP, the card number generator, etc.), the payment network (e.g., Visa, Mastercard, etc.), a validity time or duration, and/or any other suitable information. The temporary payment card number and optionally any associated information, such as the issuer or the payment network, can optionally be transmitted to the DPP, the issuer, and/or any other suitable system (e.g., for subsequent transaction settlement).

The temporary payment card number is preferably unique within the intermediary system, such that each temporary payment card number maps to a single transaction, but can alternatively be unique to a user, a wallet, a user account on the digital platform, or be otherwise mapped. The temporary payment card number is preferably globally unique within a predetermined timeframe (e.g., for a multiple of the validity duration, for an hour, for a day, for a week, etc.), wherein the temporary payment card number can be reused after the predetermined timeframe, but can alternatively be unique for all time (e.g., never reused).

The temporary payment card number can be stored in association with the transaction request (e.g., merchant identifier, transaction information, etc.), such that a subsequent payment message (including the temporary payment card number and/or transaction-associated information) can be verified against the information stored in association with the temporary payment card number. This can function to restrict temporary payment card number use to the merchant or transaction identified in the transaction request. Alternatively or additionally, the temporary payment card number can be transmitted to the DPP 130 (e.g., wherein the DPP can function as the issuer), or be otherwise managed or used.

The temporary payment card number is preferably compliant with conventional payment card standards (e.g., ISO/IEC 7812-1:1993, ANSI X4.13), but can alternatively have any suitable format. Examples of the temporary payment card number can be a credit card number, a smart card number, a debit card number, or be any other suitable card number.

In one example, the temporary payment card number can include a series of numbers, wherein the series can include: a Major Industry Identifier (MII), a Issuer Identification Number (IIN) or Bank Identification Number (BIN), an individual account number, and a checksum.

In a specific example, the MII in the temporary payment card number can be the MII associated with a PN 140 used by the intermediary system (e.g., the PN partnered with the intermediary system; a PN selected by the intermediary system based on fee, speed, or other optimization; etc.), or be otherwise determined.

In a specific example, the IIN or BIN in the temporary payment card number can be a number associated with the intermediary system 120 or an issuer system 710 (e.g., conventional bank, a card issuer platform exposing a card issuance API, etc.) associated with the intermediary system 120 (e.g., wherein the intermediary system can facilitate fund transfer from the DPP to the conventional issuer as part of S200; wherein the DPP has funds deposited with the conventional issuer to cover user transactions; etc.), or be any other suitable IIN or BIN.

In a specific example, the individual account number in the temporary payment card number can be the temporary portion of the temporary payment card number. The individual account number is preferably associated with the transaction request (e.g., with the merchant identifier, the transaction information, etc.), but can alternatively or additionally be associated with the payment information, unrelated to the transaction request, or otherwise associated with the transaction. The individual account number can be randomly generated, generated based on the transaction information (e.g., based on the transaction amount, the transaction time, the merchant identifier, etc.), be a rotating number that is temporarily assigned to the transaction request, be generated based on a set of rules, be requested from a third-party credit card number provider, or otherwise determined.

However, the temporary payment card number can be otherwise generated.

Transmitting a payment request to a payment network for processing S400 functions to interface with conventional payment processing architectures (e.g., 140) (e.g., to process the digital payment information as if it were a credit card).

All or portions of S400 are preferably performed by the intermediary system 120, but can alternatively be performed by the merchant bank 170, the POS terminal 110, the DPP 130, the acquirer 720, or by any other suitable entity. S400 is preferably performed after S300, but can alternatively be performed at any suitable time.

In some variations, the payment request is a request for requesting payment from the temporary payment card number to a merchant account associated with the transaction request, for a transaction amount identified by the transaction request.

S400 can include: generating a payment request; optionally selecting a PN 140; and transmitting the payment request to the PN (e.g., directly or via a conventional acquirer). In variants where a PN is selected, the MII associated with the PN is preferably included in the temporary payment card number; alternatively, a different MII can be used. The payment request preferably includes the temporary payment card number (generated in S300), but can alternatively include the payment information received from the user, or any other suitable information. The payment request can optionally include: transaction information (e.g., extracted from the transaction request); a merchant identifier (e.g., extracted from the transaction request or determined from the POS terminal transmitting the transaction request); or any other suitable information. In a specific example, the payment request can be an ISO 8583 message.

In a first variation, the IIN identifies the intermediary system 120 as the issuer. In operation, the PN 140 receives the payment request; identifies the intermediary system 120 as the issuer from the temporary payment card number within the payment request; and routes the payment message back to the intermediary system 120 for acceptance or denial.

In a second variation, the IIN identifies the DPP 130 as the issuer, wherein the intermediary system 120 (or other temporary payment card number provider) can transmit the temporary payment card number and any transaction-identifying information to the DPP prior to S500. In operation, the PN 140 receives the payment request; identifies the DPP 130 as the issuer from the temporary payment card number within the payment request; and routes the payment message to the DPP 130 for acceptance or denial.

In a third variation, the IIN identifies a conventional bank associated with the DPP or intermediary system as the issuer, wherein the intermediary system 120 (or other temporary payment card number provider) can include the bank's IIN or BIN and/or the DPP or intermediary system's bank account number when generating the temporary payment card number in S300. In operation, the PN 140 receives the payment request; identifies the bank as the issuer from the temporary payment card number within the payment request; and routes the payment message to the bank for acceptance or denial. In this variation, the transaction-identifying information and/or payment message transmission time can be used to map the payment request to the transaction.

In a fourth variation, the IIN identifies an issuer system (e.g., 710) that provides an API (Application Programming Interface) for generating temporary payment card numbers as the issuer. In operation, the PN 140 receives the payment request; identifies the issuer system (e.g., 710 as the issuer from the temporary payment card number within the payment request; and routes the payment message to the issuer system (e.g., 710 for acceptance or denial. However, S400 can be otherwise performed.

The method can optionally include functioning as an issuer for the payment network for transaction confirmation S500 functions to return messages compliant with the payment network's protocol. All or portions of S500 are preferably performed by the intermediary system 120, but can alternatively be performed by the issuer bank (e.g., bank associated with the intermediary system or the DPP, a third-party issuer bank, etc.), the DPP, an issuer system (e.g., 710 or by any other suitable entity. S500 is preferably performed after receiving the payment message received from the PN (e.g., after S400), but can alternatively be performed after S200 or at any suitable time.

S500 can include: receiving the payment message from the PN 140; verifying the payment message in response to payment message receipt; and transmitting an approved response to the PN when the payment message is verified, and transmitting a denied response to the PN when the payment message is not verified. The approved response or denied response is preferably returned to the PN, wherein the PN relays the response back to the POS terminal 110 for display. Alternatively, the intermediary system 120 can directly send the response to the POS terminal 110, wherein the response relayed from the PN can be ignored or otherwise managed. However, S500 can include any other suitable set of processes.

Verifying the payment message functions to confirm that the payment message is for the authorized transaction, and not for an unauthorized transaction. In some variations, verifying the payment message includes: extracting the temporary payment card number from the payment message; and determining that the temporary payment card number has not expired. In some variations, verifying the payment message includes: extracting transaction-identifying information from the payment message (e.g., transaction amount, merchant identifier); determining the authorized transaction-identifying information stored in association with the temporary payment card number; and verifying the payment message when the payment message's transaction-identifying information and the stored transaction-identifying information match. In some variations, verifying the payment message includes: confirming that the payment message corresponds to a temporary payment card number managed by the intermediary system, and optionally confirming that the funding source for the temporary payment card number of the payment message has sufficient funds for the payment request. In some variations, the system verifying the payment message (e.g., the intermediary system 120, an issuer system 710) stores information (e.g., accessed during S200) indicating that a funding source for the temporary payment card number included in the payment request has sufficient funds for the payment amount identified by the payment request. In some variations, the system verifying the payment message (e.g., the intermediary system 120, an issuer system 710) stores information (e.g., accessed during S200) identifying the funding source, and the system verifying the payment messages queries the funding source to determine whether funding source has sufficient funds for the payment amount identified by the payment request. In some variations, the funding source is a user's DPP account that is associated with the transaction request of S100. In some variations, the system verifying the payment message (e.g., the intermediary system 120, an issuer system 710) stores information (e.g., accessed during S200) identifying each temporary payment card number issued by the system verifying the payment message (and optionally identifying at least one of a funding source for the payment card number and an authorized payment amount).

In some variations, verifying the payment message includes: confirming that the payment message identifies a transaction amount identified by the transaction request, confirming that the payment message identifies a merchant identified by the transaction request, and optionally confirming that the funding source for the temporary payment card number of the payment message has sufficient funds for the payment request. However, the payment message can be otherwise verified (e.g., according to a set of rules, etc.).

Figure 6:
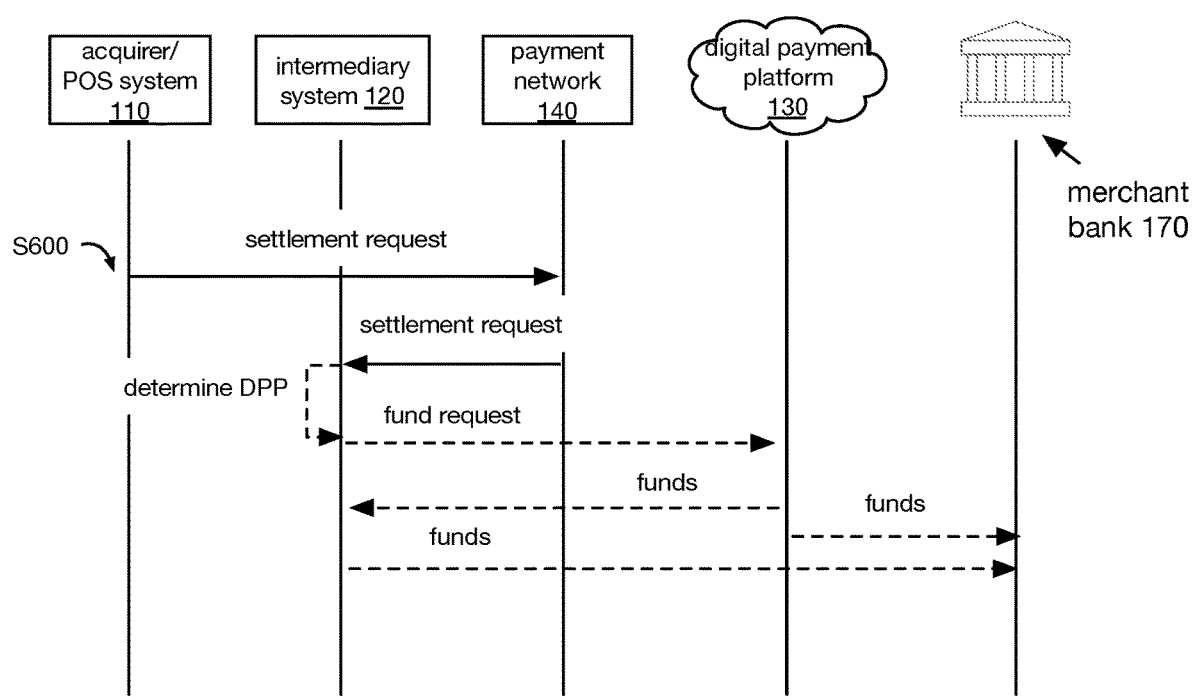
FIG. 6 is a schematic representation of an example of merchant settlement.

The method can optionally include settling the merchant transactions S600, which functions to transfer funds for the transaction into a merchant's account (e.g., via Interchange), example shown in FIG. 6.

In some variations, all or portions of S600 is performed by the PN 140. In some variations, at least a portion of S600 is performed by at least one of the intermediary system 120, the merchant bank 160, the issuer system 710, the DPP 130, the Payment Network 140, and the issuer bank 160, and/or any other suitable system. S600 can be initiated (e.g., requested) by: the merchant, the POS system 110, the acquirer system 720, the intermediary system 120, and/or any other suitable system.

In some variations, S600 includes the POS system 110 initiating a settlement request (e.g., on a predetermined schedule, in response to receipt of a user settlement request). In some variations, S600 includes the POS system 110 requesting the payment network 140 to send the settlement request to the system functioning as the issuer for the temporary payment card number (e.g., the intermediary system 120, the issuer system 710, etc.). In some variations, S600 includes the acquirer system 720 initiating a settlement request (e.g., on a predetermined schedule).

In some variations, S600 includes the payment network 140 receiving the settlement request. In some variations, S600 includes the payment network 140 forwarding the settlement request to the intermediary system 120, and the intermediary system 120 initiating transfer of funds to the merchant bank 170. In some implementations, initiating transfer of funds includes the intermediary system 120 sending a request to the DPP 130 to transfer funds (used to fund the temporary payment card number) to the merchant bank 170. In some implementations, initiating transfer of funds includes the intermediary system 120 sending a request to the DPP 130 to transfer funds (used to fund the temporary payment card number) to the intermediary system 120 (or alternatively an issuer bank 160 associated with the intermediary system 120); in response to receiving the funds from the DPP 130, the intermediary system 120 transfers the funds to the merchant bank 170. Alternatively, the intermediary system 120 transfers the funds to the merchant bank 170 before receiving the funds from the DPP 130.

In some variations, S600 includes the payment network forwarding the settlement request to the issuer system 710, and the issuer system 710 initiating transfer of funds to the merchant bank 170. In some implementations, initiating transfer of funds includes the issuer system 710 sending a request to the DPP 130 to transfer funds (used to fund the temporary payment card number) to the merchant bank 170. In some implementations, initiating transfer of funds includes the issuer system 710 sending a request to the DPP 130 to transfer funds (used to fund the temporary payment card number) to the issuer system 710 (or alternatively an issuer bank 160 associated with the issuer system 710); in response to receiving the funds from the DPP 130, the issuer system 710 transfers the funds to the merchant bank 170. Alternatively, the issuer system 710 transfers the funds to the merchant bank 170 before receiving the funds from the DPP 130.

S600 can be performed in real time, asynchronously, or at any other suitable temporal relationship to: S600 initiation, transaction confirmation, and/or another suitable event.

In some variations, S600 is performed in response to an approval response transmission in S500, (e.g., upon payment message approval). In some variations, S600 is performed in response to receipt of a settlement request from the PN 140 or merchant bank 170 (e.g., wherein the intermediary system 120 can send a request to the DPP 140 to transfer the funds from the respective user account to the merchant bank 170). In some variations, S600 is performed in response to user fund confirmation in S200. In some variations, S600 is performed in response to receipt of a merchant request. In some variations, S600 is performed at a predetermined frequency (e.g., at the end of the day, at 6 p, weekly, etc.). However, S600 can be performed at any suitable time.

The merchant account is preferably maintained by a conventional bank (e.g., merchant bank 170, but can alternatively be maintained by the DPP 140, the intermediary system 120, or by any other suitable system.

In one variation, S600 includes: receiving a settlement request including a transaction identifier (e.g., transaction amount, etc.) and a merchant account identifier from the PN 140; and initiating fund transfer to the merchant account (or other merchant deposit endpoint). The settlement request (e.g., reconciliation file, report, settlement file) can be received from the PN 140: after settlement request receipt at the PN 140 from a merchant (e.g., an individual settlement request, a batch of settlement requests, etc.); after downloading the reconciliation files from the PN 140; or at any suitable time.

Initiating fund transfer can include: transmitting a fund transfer request to the DPP 130, wherein the fund transfer request can include: the transaction identifier (or user account identifier associated with the transaction identifier) and the merchant account identifier (or other merchant deposit endpoint); transferring the funds from the DPP account to the merchant account; or otherwise initiating fund transfer.

Figure 10:
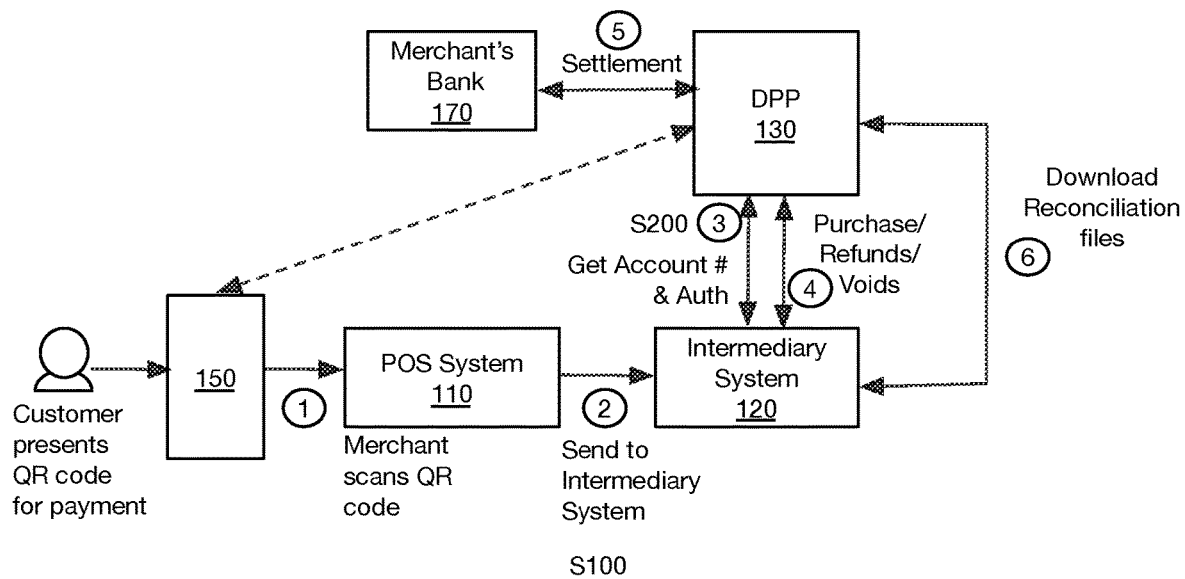
FIG. 10 is a schematic representation of a method, in accordance with variations.

In one example, the merchant systems can directly integrate with the DPP 130 (example shown in FIG. 10. In this example, the intermediary system 120 transmits a payment request directly to the DPP 130, and the DPP 130 settles the merchant transaction with the merchant bank 170.

Figure 11:
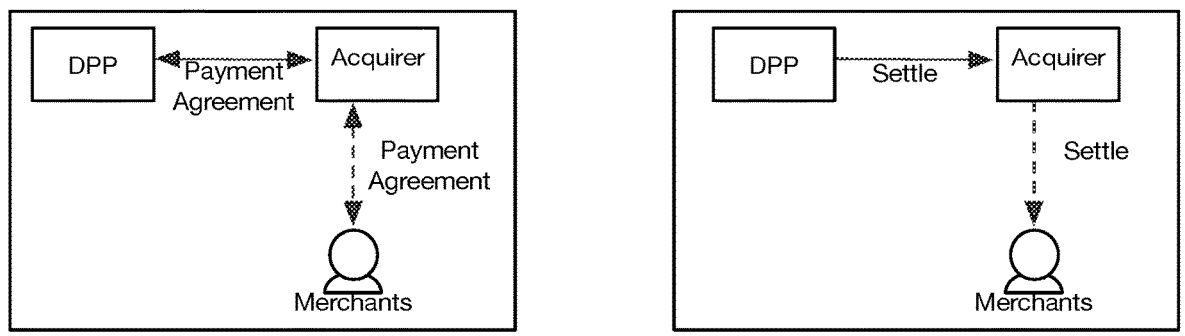
FIG. 11 is a schematic representation of a first example of a DPP relationship with the acquirer and associated settlement method.

In a second example, a payment agreement is established between the DPP 130 and the acquirer 720, and the acquirer establishes a corresponding payment agreement with the merchant (example shown in FIG. 11).

Figure 12:
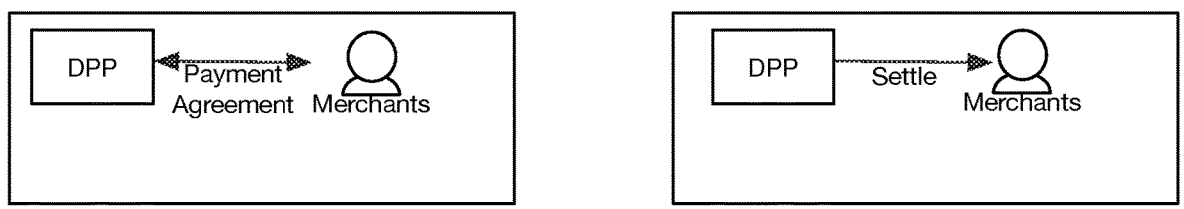
FIG. 12 is a schematic representation of a second example of a DPP relationship with the acquirer and associated settlement method.

In a third example, a payment agreement is established between the DPP 130 and the merchant (example shown in FIG. 12). However, any suitable entity can function as the issuing bank, and funds can be transferred on the DPP or DDP user's behalf to the acquirer in any suitable manner.

An alternative embodiments of the above can be implemented in a computer-readable medium storing computer-readable instructions. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
   with an intermediary system comprising a set of physical processors:
      receiving a transaction request comprising transaction information and payment information, wherein the payment information is dynamically issued by a DPP (digital payment platform), separate from the intermediary system, to a user in response to a payment information request, and wherein the transaction information comprises a transaction amount;
      after receiving the transaction request, determining whether a DPP (digital payment platform) user account associated with the payment information has sufficient funds for the transaction request;
      responsive to a determination that the DPP user account has sufficient funds for the transaction request, generating a temporary payment card number, different from the payment information, that uses the DPP as a funding source;
      generating a payment request based on the transaction information and the temporary payment card number; and
      transmitting the payment request to a payment network, separate from the DPP, wherein the payment request is a request for requesting payment from the temporary payment card number to a merchant account associated with the transaction request.

2. The method of claim 1, further comprising: receiving the transaction request from a point of sale (POS) system, wherein the transaction request identifies the merchant account.

3. The method of claim 2, further comprising: with the intermediary system:
   receiving a payment message from the payment network for the payment network payment request associated with the temporary payment card number,
   verifying the payment message, and
   transmitting an approved response to the payment network in response to successful verification of the payment message.

4. The method of claim 3, further comprising, with the intermediary system, settling payment for the payment network payment request, wherein settling payment comprises:
   responsive to receiving a settlement request from the payment network, initiating transfer of funds to a merchant bank account for the merchant account.

5. The method of claim 4, wherein initiating transfer of funds comprises:
   at the intermediary system, sending a request to a DPP that manages the DPP user account to transfer funds from a bank account of the DPP to the merchant bank account.

6. The method of claim 4, wherein initiating transfer of funds comprises:
   at the intermediary system, sending a request to a DPP that manages the DPP user account to transfer funds from a bank account of the DPP to a bank account of the intermediary system; and
   at the intermediary system, initiating transfer from the bank account of the intermediary system to the merchant bank account.

7. The method of claim 6, further comprising the POS system requesting the payment network to send the settlement request to the intermediary system.

8. The method of claim 2, further comprising the POS system requesting the payment network to send a settlement request to an issuer system used to generate the temporary payment card number.

9. The method of claim 1, wherein generating the temporary payment card number that uses the DPP as a funding source comprises: sending a request to an issuer system to generate the temporary payment card number, wherein the request identifies the DPP as the funding source for the temporary payment card number.

10. A method comprising:
    receiving a transaction request comprising a transaction amount and payment information at an intermediary system, wherein the payment information is issued by a DPP (Digital Payment Platform) separate from the intermediary system;
    with the intermediary system, after receiving the transaction request, determining whether a DPP user account associated with the payment information has sufficient funds for the transaction request;
    with the intermediary system, responsive to a determination that the DPP user account has sufficient funds for the transaction request, determining a temporary payment card number, different from the payment information, and storing the temporary payment card number in association with the DPP user account; and
    with the intermediary system, transmitting a payment request to a payment network, separate from the DPP, wherein the payment request requests payment from the temporary payment card number to a merchant account of the payment network, associated with the transaction request, for the transaction amount.

11. The method of claim 10, further comprising, with the intermediary system, functioning as an issuer for the temporary payment card number, comprising:
    receiving a payment message from the payment network for the payment network payment request,
    verifying the payment message, and
    transmitting an approved response to the payment network in response to successful verification of the payment message.

12. The method of claim 11, wherein verifying the payment message comprises:
    confirming that the payment message corresponds to a temporary payment card number managed by the intermediary system, and
    confirming that the payment message was received within an active time window associated with the temporary credit card.

13. The method of claim 11, wherein verifying the payment message comprises:
    confirming that the payment message identifies a transaction amount identified by the transaction request,
    confirming that the payment message identifies a merchant identified by the transaction request, and
    confirming that the funding source for the temporary payment card number of the payment message has sufficient funds for the payment request.

14. The method of claim 10, further comprising, with a point of sale (POS) system:
    receiving payment information;
    responsive to the payment information, determining whether the payment information corresponds to a DPP; and
    responsive to a determination that the payment information corresponds to a DPP, transmitting the transaction request to the intermediary system, wherein the transaction request includes the payment information and identifies the merchant account and the transaction amount.

15. The method of claim 14, wherein the POS system receives the payment information via at least one of a camera, a user input device, and a wireless communication system of the POS system.

16. The method of claim 10,
    wherein the transaction request includes payment information received by a POS system, and wherein the transaction request identifies the merchant account and the transaction amount, and
    wherein the method further comprises determining whether the payment information corresponds to a DPP,
    wherein the intermediary system determines whether the DPP user account has sufficient funds, responsive to a determination that the payment information corresponds to a DPP.

17. The method of claim 10, wherein determining the temporary payment card number comprises requesting the temporary payment card number from a third party temporary credit card generator.

18. The method of claim 10, wherein determining the temporary payment card number comprises generating a temporary payment card number.

19. The method of claim 10, further comprising determining a payment network associated with the merchant account, wherein determining the temporary payment card number comprises facilitating generation of a temporary payment card number associated with the payment network.

20. The method of claim 10, further comprising storing the DPP user account as a funding source for the temporary payment card number.

* * * * *